United States Patent Office.

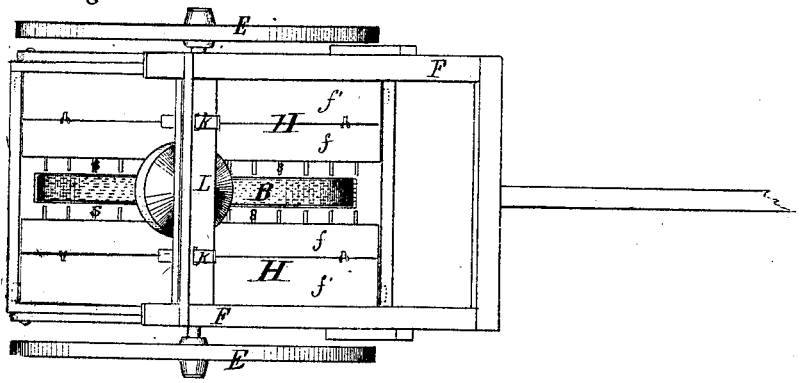
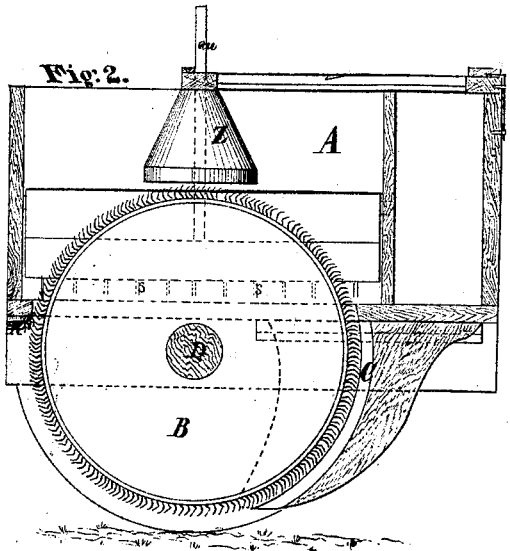
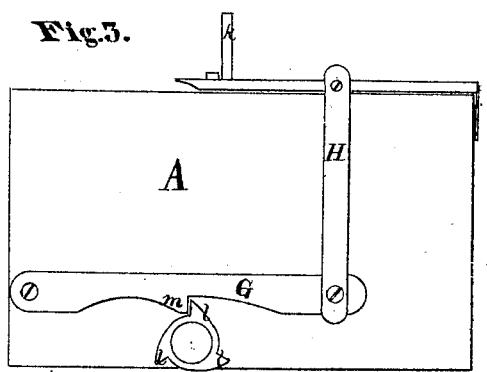

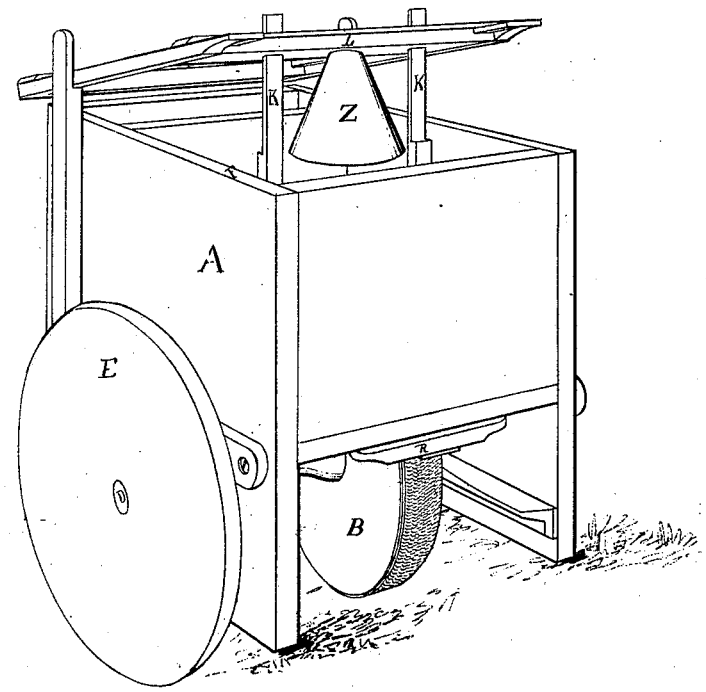

JOHN HUGHES, OF NEW BERNE, NORTH CAROLINA.

Letters Patent No. 113,671, dated April 11, 1871.

IMPROVEMENT IN COTTON-PLANTERS.

The Schedule referred to in these Letters Patent and making part of the same.

*To all whom it may concern:*

Be it known that I, JOHN HUGHES, of New Berne, in the county of Craven and State of North Carolina, have invented a new and valuable Improvement in "Cotton-Planters;" and I do hereby declare that the following is a full, clear, and exact description of the construction and operation of the same, reference being had to the annexed drawing making a part of this specification, and to the letters and figures of reference marked thereon.

Figure 1 of the drawing is a plan view of my invention.

Figure 2 is a central vertical section.

Figure 3 is a side view with wheels removed.

Figure 4 is a perspective view.

My invention has relation to an improvement in machines for planting cotton-seed; and It consists in the construction and novel arrangement of devices whereby the seed is continually agitated and intermingled in the seed-box, and forced through the seed-conduit.

This cotton-seed planter is designed to be used separately, as hereinafter described; or it may be provided with a drill in front and scraper behind, if the latter combination should be preferred.

The letter A of the drawing designates the seed-box, in the bottom of which is cut a slot for the passage of the central wheel B, which performs the planting operation by carrying the seed down through the curved conduit C.

The wheel B is secured rigidly to the axle D, as also are the supporting-wheels E at each side of the seed-box.

F represents a rectangular frame, hinged to the upper and forward edge of the box A, and connected, by the bar H, with the arm G, which is pivoted to the side of the box A at the rear end thereof.

At each end of the axle, within the wheels E, are the cam-teeth $l\ l$. These cam-teeth are rigidly secured to the axle, and serve to cause the arm G to rise and fall. These teeth are designed to work against a tooth, $m$, on the lower edge of the arm G.

H H represent valve-plates, hinged to the lateral walls of the seed box, and attached, by means of the connecting-rods $k\ k$, to the transverse bar L of the vibrating frame F.

These connecting-rods $k\ k$ pass through openings $v\ v$ in the bar L, and are provided with the stops $u\ u$, the object being to allow more movement to the pounder, hereafter described, than is required by the hinged valve-plates H H, while both are operated by the same vibrating frame F.

Each valve-plate H is made in two portions, $f'$ and $f$, which are hinged together longitudinally in such a manner that the two portions or plates $f'$ and $f$ can fold toward each other on one side, but not on the other.

The object of this arrangement is to allow these plates to be pushed downward and outward through the seed with ease by their folding up, while, when they are drawn upward and inward, they will become expanded to their full extent, carrying the seed with them, and throwing the seed up over the central planting-wheel B.

B represents the planting-wheel. This is provided on its periphery with a number of radially-projecting points or wires, which serve to engage the fibers of the cotton-seed and force them through the curved spout C.

Carding-cloth or wire brush may be employed, but it is preferable to have the wires somewhat more separated than is usual in these manufactured articles.

The seed-pockets $n\ n$ are formed by leaving spaces upon the periphery of the wheel, which are without the wires or projections.

If, instead of planting at fixed distances or in hills, it be desired to plant in drills, the pockets may be furnished with wires to correspond with the residue of the periphery. The seed will thus be drawn by the teeth into the conduit, and the number of seed sown will depend on the adjustment of this conduit, which is made movable toward or from the wheel B with this object in view.

In order to provide for planting a single row of seed when desirable a channel of suitable width is formed, at $n$, along the middle of the conduit.

Z represents the plunger. It is secured to the transverse bar L, with which it rises and falls. It is placed centrally over the wheel B, and serves, by its downward blows, to break up the large masses of seed, and to prevent the formation of a dome or crust over the planting-wheel B.

Teeth $s\ s$ are employed at the inner edges of the valve-plates H H, and serve to assist in breaking up the masses of seed as they are thrown toward the center, that they may readily pass into the conduit.

The plunger, in its descent, forces the seed, which has been heaped up in the center by the valve-plates, to come in close contact with the wires of the planting-wheel. The said wires seize the fibers of the seed and draw the seed thereby down into the conduit.

R designates a wire brush, which serves for cleaning the projections on the periphery of the wheel when they become clogged with the cotton-seed fibers, &c.

The above-described cotton-seed planter will also operate as a guano-mixer, and will thus enable the farmer to mix the guano and seed together while planting the same.

Having thus fully described my invention,

What I claim as new, and desire to secure by Letters Patent, is—

1. In combination with the valve-plates H H, the plunger Z, when arranged to operate in a cotton-seed planter substantially as specified.

2. In a cotton-seed planter, the combination, with the central wheel B and conduit L, of the valve-plates H and plunger Z, substantially as specified.

3. In a cotton-seed planter, the combination, with a planting-wheel, B, of the elastic teeth extending radially from its periphery, substantially as specified.

4. In a cotton-seed planter, the combination of the center wheel B and hinged lateral valve-plates H, provided with the edge-teeth $s\ s$, substantially as specified.

In testimony that I claim the above I have hereunto subscribed my name in the presence of two witnesses.

JNO. HUGHES.

Witnesses:
C. W. McLEAN,
J. FULFORD.